US008266836B2

(12) United States Patent
Ware et al.

(10) Patent No.: US 8,266,836 B2
(45) Date of Patent: *Sep. 18, 2012

(54) REMOTE CONTROL DECOY

(76) Inventors: Brett Ware, Marysville, MO (US); John Iden, Platte City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/930,184

(22) Filed: Dec. 30, 2010

(65) Prior Publication Data

US 2011/0094143 A1 Apr. 28, 2011

Related U.S. Application Data

(63) Continuation of application No. 10/896,239, filed on Jul. 21, 2004.

(51) Int. Cl.
*A01M 31/06* (2006.01)

(52) U.S. Cl. ............................ 43/3; 43/26.1; 43/17.5

(58) Field of Classification Search .............. 43/2, 3, 43/26.1, 17.5
See application file for complete search history.

(56) References Cited

U.S. PATENT DOCUMENTS

| | | | | |
|---|---|---|---|---|
| 2,443,040 A * | 6/1948 | Jones | | 43/3 |
| 2,460,128 A * | 1/1949 | Greenleaf | | 43/3 |
| 2,704,416 A * | 3/1955 | Laird | | 43/3 |
| 2,799,960 A * | 7/1957 | Riley | | 43/3 |
| 2,814,146 A * | 11/1957 | Propp | | 43/3 |
| 2,835,064 A * | 5/1958 | Webb | | 43/3 |
| 3,000,128 A * | 9/1961 | McAda | | 43/3 |
| 3,074,195 A * | 1/1963 | Vanderpool | | 43/3 |
| 3,636,910 A * | 1/1972 | Tsuchiya | | 440/59 |
| 3,689,927 A * | 9/1972 | Boston et al. | | 43/3 |
| 3,848,561 A * | 11/1974 | Price | | 440/69 |
| 4,270,307 A * | 6/1981 | Arigaya | | 446/154 |
| 4,322,908 A * | 4/1982 | McCrory | | 43/3 |
| 4,339,888 A * | 7/1982 | Sheng-Jung | | 43/26.1 |
| 4,612,722 A * | 9/1986 | Ferrell | | 43/3 |
| 5,203,729 A * | 4/1993 | Beller et al. | | 446/154 |
| 5,309,664 A * | 5/1994 | Wright | | 43/26.1 |
| 5,377,439 A * | 1/1995 | Roos et al. | | 43/3 |
| 5,581,932 A * | 12/1996 | Bell | | 43/26.1 |
| 5,636,466 A * | 6/1997 | Davis | | 43/3 |
| 5,775,022 A * | 7/1998 | Sumrall et al. | | 43/3 |
| 5,809,683 A * | 9/1998 | Solomon | | 43/3 |
| 5,903,997 A * | 5/1999 | Jacob | | 43/2 |
| 5,930,936 A * | 8/1999 | Parr et al. | | 43/3 |
| 6,122,852 A * | 9/2000 | Mechling, IV | | 43/26.1 |
| 6,321,480 B1 * | 11/2001 | Solomon | | 43/3 |
| 6,339,894 B1 * | 1/2002 | Solomon | | 43/3 |
| 6,412,209 B1 * | 7/2002 | Kapraly et al. | | 43/3 |
| 6,412,210 B1 * | 7/2002 | Horrell | | 43/3 |
| 6,460,284 B1 * | 10/2002 | Rabo | | 43/3 |
| 6,470,621 B2 * | 10/2002 | Murray et al. | | 43/3 |
| 6,553,709 B1 * | 4/2003 | Owen | | 43/3 |
| 6,574,903 B2 * | 6/2003 | Solomon | | 43/3 |
| 6,601,333 B2 * | 8/2003 | Cicoff et al. | | 43/2 |
| 7,472,508 B2 * | 1/2009 | Myers, IV | | 43/3 |
| 7,941,963 B2 * | 5/2011 | Myers, IV | | 43/3 |
| 7,975,421 B2 * | 7/2011 | Ware et al. | | 43/3 |
| 8,146,285 B1 * | 4/2012 | Jones et al. | | 43/3 |

(Continued)

*Primary Examiner* — Darren W Ark
(74) *Attorney, Agent, or Firm* — Brett Trout (57) ABSTRACT

A remote controlled decoy is provided. The remote control decoy operates using two propellers secured to a hull and remotely controlled by a radio frequency transmitter. A shell resembling a particular waterfowl is releasably coupled to a hull which serves as a watertight compartment for the receiver and the electronics associated with the propulsion of the decoy. The decoy may also be provided with strobe lights to draw attention to the decoy from passing waterfowl.

17 Claims, 7 Drawing Sheets

U.S. PATENT DOCUMENTS

| | | | |
|---|---|---|---|
| 2004/0025770 A1* | 2/2004 | Saunoris et al. | 43/3 |
| 2005/0102883 A1* | 5/2005 | Temes | 43/26.1 |
| 2006/0016115 A1* | 1/2006 | Ware et al. | 43/3 |
| 2007/0006516 A1* | 1/2007 | LaCroix | 43/26.1 |
| 2009/0188148 A1* | 7/2009 | Orris et al. | 43/3 |
| 2011/0067289 A1* | 3/2011 | Lane | 43/3 |

* cited by examiner

REMOTE CONTROL DECOY

This patent application is a Continuation of U.S. Ser. No. 10/896,239 filed on Jul. 21, 2004.

BACKGROUND OF THE INVENTION

1. Field of the Invention

The present invention relates in general to a remote control decoy and, more specifically, to a radio controlled decoy with improved maneuverability and waterfowl attraction capabilities.

2. Description of the Prior Art

It is well known in the art to provide decoys of various types to attract game to a hunter. When hunting waterfowl, it is often desirable to utilize floating decoys. While such decoys are useful for attracting game, they have several important drawbacks. Drawbacks include the large number of decoys required, the difficulty in setting and retrieving the decoys, the disruption of the habitat during the critical period of time when the decoys are set, the unrealistic motion of the decoys, and the inability of such decoys to attract waterfowl from great distances.

It is known in the art to provide remote controlled decoys such as that shown in U.S. Pat. No. 5,377,439 to Roos, et al. Such remote control decoys avoid the disadvantages associated with setting and retrieving the decoys, and somewhat reduce the number of decoys needed. However, the disadvantages associated with using multiple transmitters, the requirement of additional units for different species of waterfowl, the difficulty in attracting waterfowl from large distances, and low maneuverability remain. It would, therefore, be desirable to provide a decoy which further reduced the number of decoys required, added more realistic maneuverability to the decoy, and was capable of drawing waterfowl from great distances. The difficulties encountered in the prior art discussed hereinabove are substantially eliminated by the present invention.

SUMMARY OF THE INVENTION

In an advantage provided by this invention, a remote control decoy is provided with improved maneuverability.

Advantageously, this invention provides a remote control decoy adaptable for different types of waterfowl.

Advantageously, this invention provides means for remotely controlling a plurality of decoys utilizing a single transmitter.

Advantageously, this invention provides a remote controlled decoy with forward, reverse and narrow radius turning capabilities.

Advantageously, this invention provides a remote controlled decoy with improved waterfowl attractant system.

Advantageously, this invention provides an improved method of laying and retrieving decoys.

Advantageously, in the preferred embodiment of this invention, a remote controlled decoy is provided with two propellers, each independently controlled by a different joystick of a transmitter. The transmitter is adjustable to allow the transmitter to control a plurality of different decoys, which may also be adapted to tow a non-powered decoy, to produce a realistic courting action. The decoy is also preferably provided with a strobe light to simulate the flapping of wings at great distances.

Advantageously this invention provides an improved waterfowl attracting system utilizing strobe lights to simulate wing action. The lights may be turned on when waterfowl are at a great distance, and turned off when the waterfowl comes closer.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
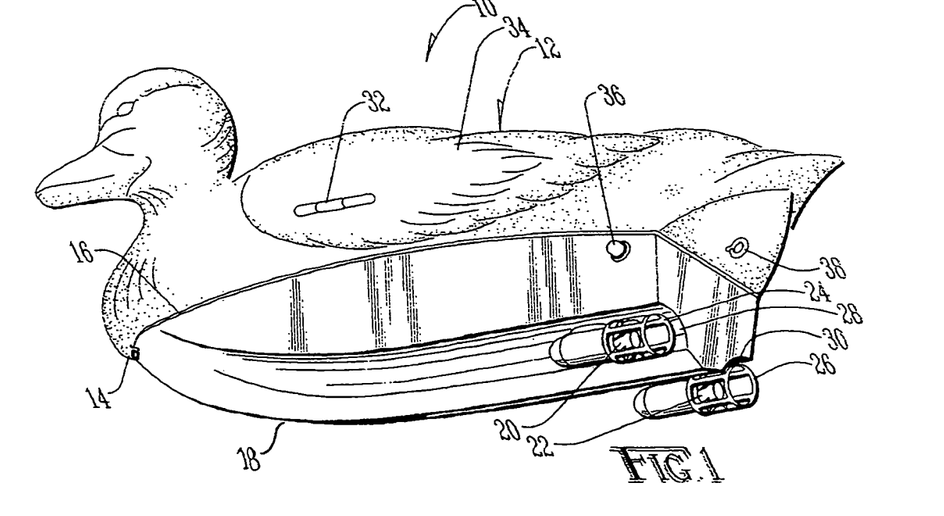
FIG. 1 illustrates a bottom perspective view of the remote controlled decoy of the present invention.

A remote controlled decoy according to this invention is shown generally as (10) in FIG. 1. The decoy includes a shell (12), preferably formed of any material known in the art for producing decoys, but is preferably resilient and colored to resemble the coloring of an actual waterfowl. As shown in FIG. 1, the shell (12) is formed and colored to resemble a mallard hen. The shell is preferably provided with a hook (14), formed of metal or similarly strong material. As shown in FIG. 1, the hook (14) overhangs and engages a lip (16) provided along a perimeter of a rigid plastic hull (18) to maintain the shell (12) in contact with the hull (18).

As shown, the hull (18) is provided with a first propeller (20) and a second propeller (22). The first propeller (20) is preferably provided within a first weed cage (24) and the second propeller (22) is provided within a second weed cage (26). The weed cages (24) and (26) may be constructed of any suitable material, but are preferably constructed of a rigid plastic material formed to define openings narrow enough to prevent the ingress of large weeds into contact with the propellers (20) and (22), yet large enough to limit a significant loss of power associated with reduced flow of water into contact with the propellers (20) and (22). Although the hull (18) may be of any desired shape, it is preferably injection molded of plastic to provide a first recess (28) and second recess (30), to accommodate the first propeller (20) and second propeller (22). As shown in FIG. 1, the shell (12) is provided on its surface with a plurality of small strobe lights (32). The strobe lights (32) may be of any suitable type known in the art, but are preferably located near the wing (34) of the decoy (10).

Figure 2:
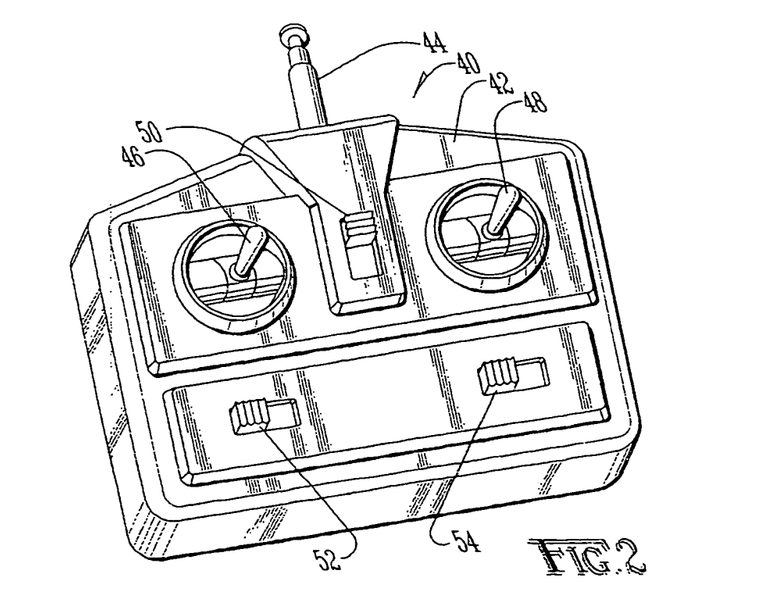
FIG. 2 illustrates a bottom perspective view of the transmitter associated with the remote controlled decoy of the present invention.

Located on the hull (18) is an on/off switch (36), which may alternatively be located in any desired location. Provided on the shell (12) is an eyelet (38) for a purpose described below. Shown in FIG. 2 is a transmitter (40) utilized in association with the decoy (10) of the present invention. As shown in FIG. 2, the transmitter (40) is of a standard type known in the art to produce radio frequency signals. The transmitter (40) is preferably provided with a housing (42) and an antenna (44). Coupled to the housing (42) is a first joystick (46) and a second joystick (48). Also provided on the transmitter (40) is an on/off switch (50), a radio frequency switch (52) and a strobe switch (54). Although the transmitter (40) may be constructed of any suitable type known in the art, it is preferably designed to operate on the frequencies 27 MHz and 49 MHz.

Figure 3:
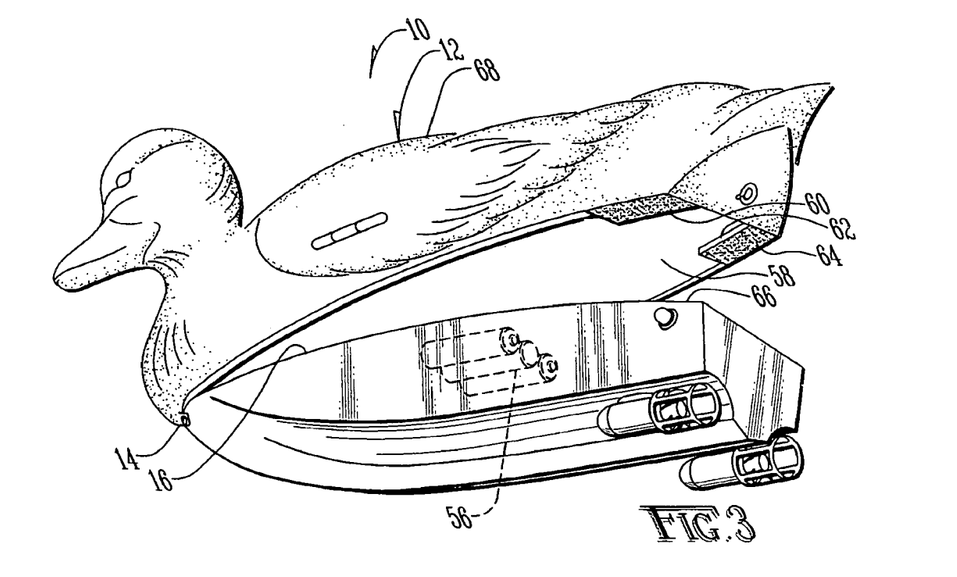
FIG. 3 illustrates a bottom perspective view in partial cutaway of the shell of the decoy being removed from the hull.

If it is desired to remove the shell (12) for replacement, or to access batteries (56) provided within the hull (18), the shell (12) may be removed from the hull (18). As shown in FIG. 3, the shell (12) is preferably provided with a hollow interior (58), a first inwardly directed ear (60) and a second inwardly directed ear (62). Although the ears (60) and (62) may be constructed of metal, in the preferred embodiment they are constructed of a material similar to that used to construct the shell (12). The ears (60) and (62) are preferably provided with a latch and hook material (64) which fits into mating engagement with hook and latch material (66) coupled to the hull (18). While the hook (14) and ears (60) and (62) serve to secure the shell (12) to the hull (18), in the preferred embodiment, the coupling is not watertight but, instead, is merely overlapping to allow moisture contacting the back (68) of the shell (12) to roll downward across the shell (12) and away from the hull (18). Preferably, the hull (18) itself is substantially watertight, with the batteries (56) and other electrical components being protected from moisture, regardless of whether or not the shell (12) is attached to the hull (18).

Figure 4:
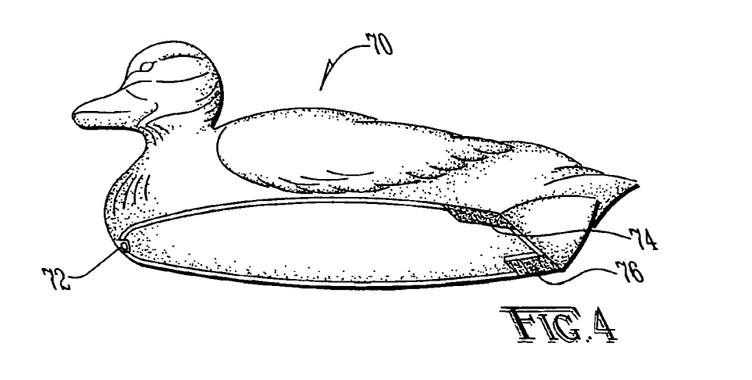
FIG. 4 illustrates a bottom perspective view of a supplemental shell representing a different waterfowl.

Shown in FIG. 4 is a supplemental shell (70) similar in all respects to the shell (12), except that the shell (70) is configured in size, shape and coloring to resemble a teal, rather than a mallard hen. If it is desired to adjust the decoy (10) to resemble a teal, the hook (72) is provided over the lip (16) of the bare hull (18), and the supplemental shell (70) is rotated onto the hull (18) until the supplemental ears (74) and (76) contact the hook and latch material (66) of the hull (18), thereby securing the supplemental shell (70) to the hull (18). FIGS. 3-4.

Figure 5:
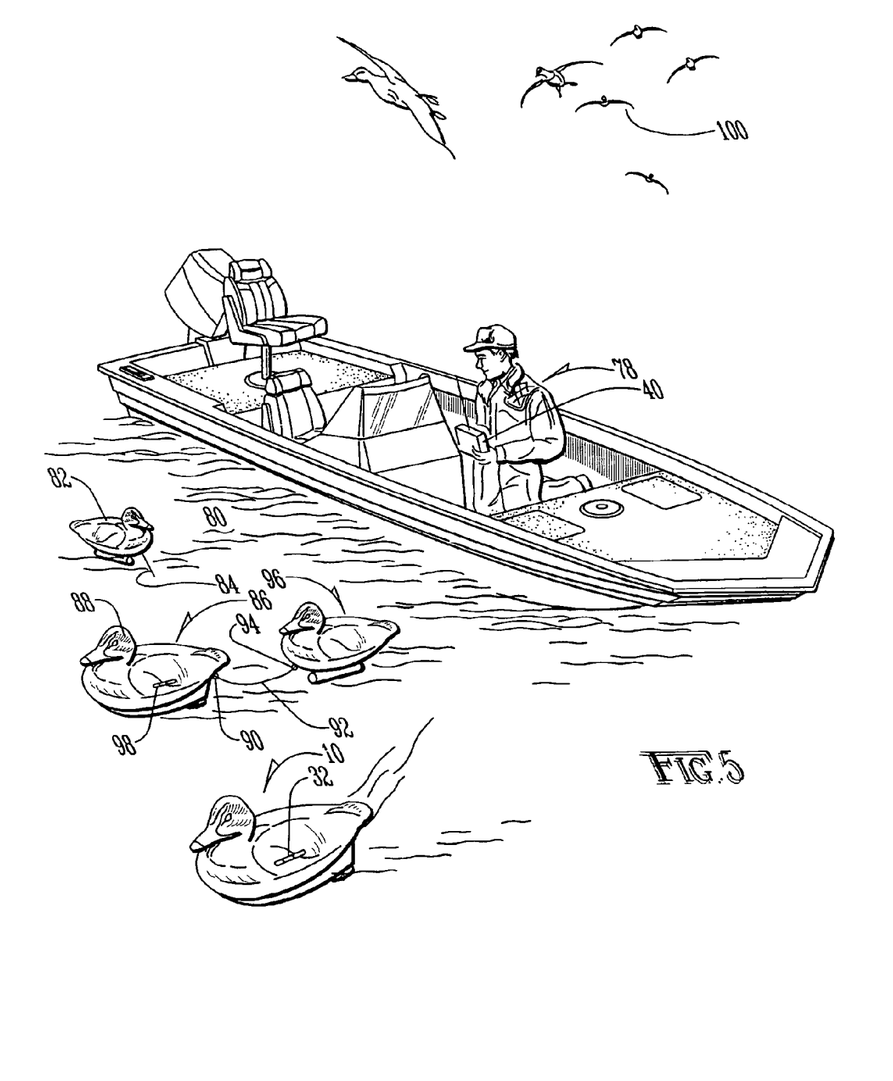
FIG. 5 illustrates a top perspective view of a hunting scenario, shown with multiple decoys being controlled by a single transmitter.

As shown in FIG. 5, when it is desired to utilize the decoy (10) of the present invention, a hunter (78) merely actuates the on/off switch (36) of the decoy (10), and the on/off switch (50) of the transmitter (40), and sets the decoy (10) into the water (80). FIGS. 1, 3 and 5. The hunter (78) thereafter utilizes the joysticks (46) and (48) to control the speed of the propellers (20) and (22) to motivate the decoy (10) into a desirable position. As shown in FIG. 5, the decoy (10) may be utilized in association with static decoys (82), such as those known in the art, which may be tethered utilizing an anchor line (84) in a manner such as that known in the art.

Alternatively, or additionally, a supplemental decoy (86) may be utilized and configured similarly to that described above in association with the decoy (10). As shown in FIG. 5, the supplemental decoy (86) is provided with a mallard hen shell (88) and is coupled through an eyelet (90) via fishing line (92) or similar connection means to an eyelet (94) provided on a standard decoy (96), which is configured to resemble a mallard drake. Preferably, the supplemental decoy (86) is designed to operate in response to a 49 MHz signal, while the decoy (10) is designed to operate on a 27 MHz signal. Accordingly, the hunter (78) may utilize the radio frequency switch (52) on the transmitter (40) to toggle back and forth between controlling the supplemental decoy (86) and decoy (10), utilizing the joysticks (46) and (48) of the transmitter (40). In this manner, the hunter may control a single decoy or a double decoy combination configured to resemble a mating pair.

If it is desired to attract waterfowl from a long distance, the hunter (78) may actuate the strobe switch (54) which causes the strobe lights (32) to strobe at a predetermined frequency and intensity desired by the hunter (78), in accordance with the type of waterfowl being harvested and the specific conditions associated with the particular harvest. If desired, the strobe lights (32) may be configured to remain in either an actuated or deactuated state until specifically actuated or deactuated by the hunter (78). In this manner, the hunter (78) may actuate the strobe lights (98) of the supplemental decoy (86) simultaneously, utilizing the radio frequency switch (52) and strobe switch (42) of the transmitter (40). Preferably, the hunter actuates the strobe lights (32) and (98) when waterfowl (100) can be seen at a distance. The hunter (78) may maintain the strobe lights (32) and (98) actuating until the waterfowl (100) are close enough to be attracted by the realistic movement of the decoy (10) and supplemental decoy (86). At this point, the strobe lights (32) and (98) are preferably shut off to prevent the waterfowl (10) from flaring and exiting the area upon recognition of the strobe lights (32) and (98) not being actual feather movement of real waterfowl.

After the harvest has been completed, the hunter (78) merely utilizes the transmitter (42) to direct the decoy (10) and supplemental decoy (86) back to the hunter (78), where they may be retrieved. If static decoys (82) are utilized, the hunter (78) must still go retrieve these decoys in a manner such as that known in the art.

Figure 6:
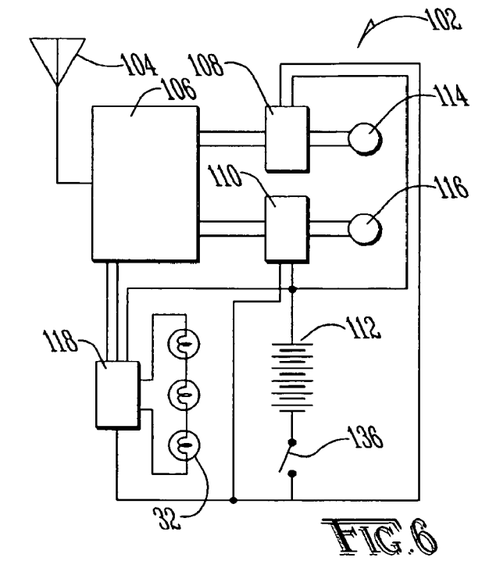
FIG. 6 illustrates a schematic of the electronics associated with the decoy of the present invention.

A schematic of the electronics provided within the hull (18) is shown generally as (102). As shown, an antenna (104) is coupled to a receiver (106), such as those well known in the art for use in association with remote control cars and boats. The receiver (106) in turn is coupled to a first motor controller (108), such as a throttle, and a second motor controller (110), such as a throttle. The motor controllers (108) and (110) are coupled to a battery (112) which is sufficiently powerful to motivate the motors (114) and (116) coupled to the motor controllers (108) and (110) and the propellers (20) and (22). FIGS. 1 and 6. The motor controllers (108) and (110) are of a type known in the art to attenuate the supply of power from the battery (112) to the motors (114) and (116) in response to signals received from the receiver (106), which, in turn, are provided by the transmitter (40) in response to manipulation of the joysticks (46) and (48) by the hunter (78). The motors (114) and (116) are separately controlled to drive the propellers (20) and (22) at different speeds to cause the decoy to turn in response to differential movements of the joysticks (46) and (48). Also, as shown in FIG. 6, the receiver (106) is coupled to a light controller (118) which, in turn, is coupled to the strobe lights (32) and to the battery (112) to actuate and deactuate the strobe lights (32) in response to signals received from the receiver (106). As shown in FIG. 6, the battery (112) is coupled to the on/off switch (36). As noted above, the electronics associated with the receiver (106), except the strobe lights (32), are contained within the hull in a watertight manner.

Figure 7:
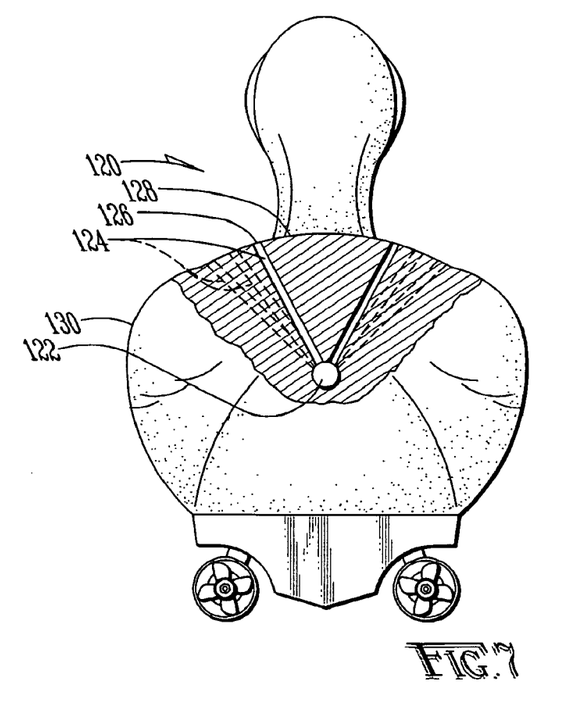
FIG. 7 illustrates a rear perspective view of an alternative embodiment of the present invention, shown in partial cutaway to reveal an alternative arrangement to mount the strobes in the decoy.

An alternative embodiment of the present invention is shown generally as (120) in FIG. 7. In this embodiment, a single, powerful strobe light (122) is in communication with a plurality of tapered bores (124) opening into holes (126) provided on the back (128) of the shell (130) of the alternative embodiment of the decoy (120). In this manner, a single strobe light (122) may be used to direct light to a plurality of holes (126) to give the illusion of a plurality of lights and, from a distance, wing movement.

Figure 8:
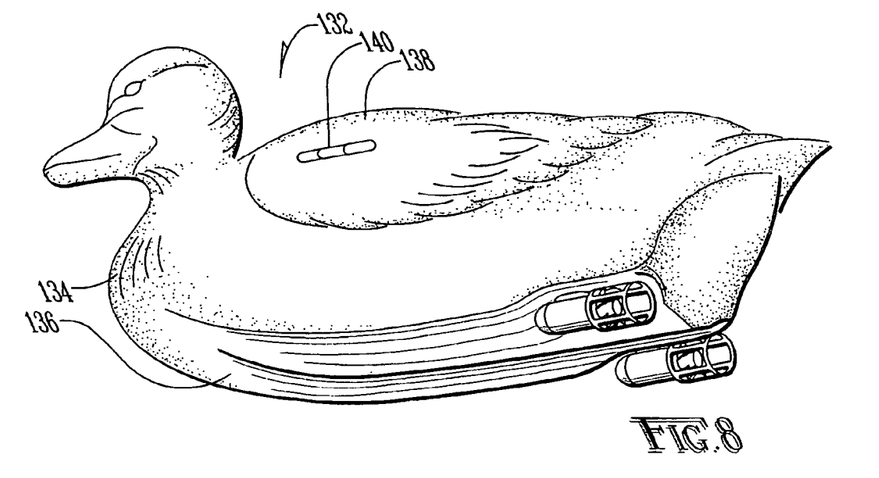
FIG. 8 illustrates another alternative embodiment of the present invention, utilizing a shell integrally formed with the hull.

Another alternative embodiment of the instant invention is shown generally as (132) in FIG. 8. As shown, the shell (134) is integrally formed with the hull (136) to make the decoy (132) even more realistic and to provide the decoy with even greater protection against water seeping into the decoy (132). In this embodiment, the back (138) preferably lifts up to reveal the interior of the decoy (132) to allow for access to the propeller motors, batteries, switch (not shown), and strobe lights (140). The back (138) is preferably constructed of the same material as the shell (134). The back (138) may be easily lift and allowed to resiliently return to its former state when released.

Figure 9:
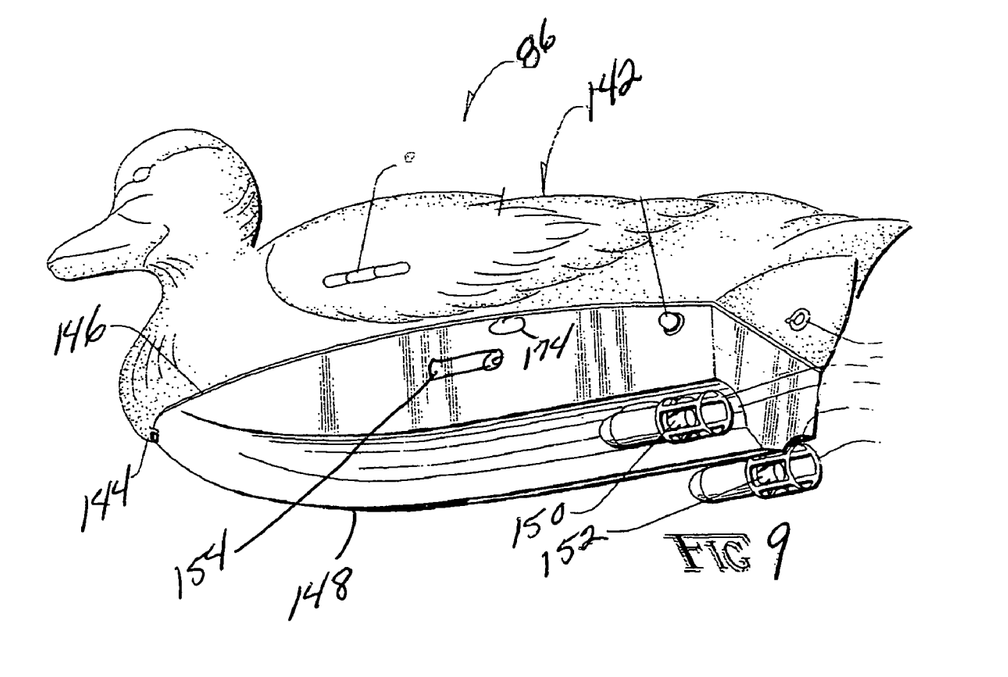
FIG. 9 illustrates a bottom perspective view of the supplemental remote control decoy of the present invention.

The supplemental decoy is shown generally as (86) in FIG. 9. The supplemental decoy (86) is provided with a shell (142) provided with a hook (144) that overhangs and engages a lip (146) provided along a perimeter of a rigid plastic hull (148) to maintain the shell (142) in contact with the hull (148). The hull (148) is provided with a first propeller (150) and a second propeller (152). Batteries (154) are provided within the hull (148) in a manner such as that described above in association with the decoy (10).

Figure 10:
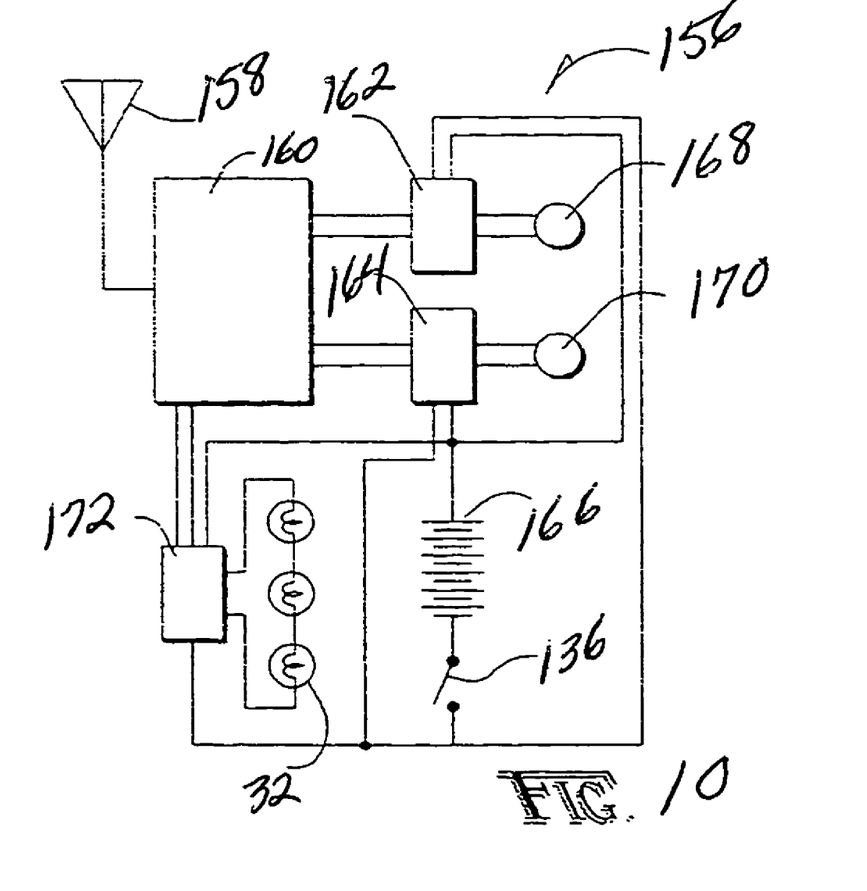
FIG. 10 illustrates a schematic of the electronics associated with the supplemental decoy of the present invention.

A schematic of the electronics provided within the hull (148) is shown generally as (156) in FIG. 10. As shown, an antennae (158) is coupled to a receiver (160) in a manner such as that described above in association with the decoy (10). The receiver (160) is coupled to a third motor controller (162), such as a throttle, and a fourth motor controller (164), such as a throttle. The motor controllers (162) and (164) are coupled to a battery (166) which is sufficiently powerful to motivate the motors (168) and (170) coupled to the motor controllers (162) and (164) and the propellers (150) and (152). FIGS. 9-10. The motor controllers (162) and (164) are the type known in the art to attenuate the supply of power from the battery (166) to the motors (168) and (170) in response to signals received from the receiver (106) which, in turn, are provided by the transmitter (40) in response to manipulation of the joysticks (46) and (48) by the hunter (78), when the hunter (78) uses the radio frequency switch (52) on the transmitter (10) to toggle the switch (52) to the 49 MHz signal. The motors (168) and (170) are separately controlled to drive the propellers (150) and (152) at different speeds to cause the supplemental decoy (86) to turn in response to different movements of the joysticks (46) and (48). Also, as shown in FIG. 10, the receiver (160) is coupled to a light controller (172) which, in turn, is coupled to the strobe lights (174) and to the battery (166) to actuate and deactuate the strobe lights (174) in response to signals received from the receiver (160).

Although the invention has been described with respect to the preferred embodiment thereof, it is to be understood that it is not to be so limited, since changes and modifications can be made therein which are within the full, intended scope of this invention as defined by the appended claims. For example, it is anticipated that the hull (18) of the present invention may be utilized without the shell (12) for recreational use and may be modified to resemble a model watercraft. It is additionally anticipated that the decoy (10) may be programmed to follow a predetermined course or tethered to a line instead of, or in addition to, being remotely controlled by the transmitter (40). It is also anticipated that any number of decoys may be controlled with differing frequencies utilized by the transmitter (40). It is also anticipated that a plurality of decoys may be controlled simultaneously on a single frequency using the transmitter to cause the decoys to make simultaneous movements.

What is claimed is:

1. A radio controlled watercraft system comprising:
  (a) a hull;
  (b) a first motor coupled to the hull;
  (c) a first throttle coupled to the first motor;
  (d) a first propeller coupled to the first motor;
  (e) a second motor coupled to the hull;
  (f) a second throttle coupled to the second motor;
  (g) a second propeller coupled to the second motor;
  (h) a first electromagnetic signal generator;
  (i) a second electromagnetic signal generator;
  (j) a first electromagnetic signal receiver;
  (k) a second electromagnetic signal receiver;
  (l) wherein the first electromagnetic signal receiver is coupled to the first throttle;
  (m) wherein the second electromagnetic signal receiver is coupled to the second throttle;
  (n) a supplemental hull;
  (o) a third motor coupled to the supplemental hull;
  (p) a third throttle coupled to the third motor;
  (q) a third propeller coupled to the third motor;
  (r) a fourth motor coupled to the supplemental hull;
  (s) a fourth throttle coupled to the fourth motor;
  (t) a fourth propeller coupled to the fourth motor;
  (u) a third electromagnetic signal generator;
  (v) a fourth electromagnetic signal generator;
  (w) a third electromagnetic signal receiver;
  (x) a fourth electromagnetic signal receiver;
  (y) wherein the third electromagnetic signal receiver is coupled to the third throttle;
  (z) wherein the fourth electromagnetic receiver is coupled to the fourth throttle; and
  (aa) a housing containing the first electromagnetic signal generator, the second electromagnetic signal generator, the third electromagnetic signal generator and the fourth electromagnetic signal generator.

2. The radio controlled watercraft system of claim 1, further comprising a replica of a waterfowl coupled to the hull.

3. The radio controlled watercraft system of claim 1, further comprising:
  (a) a first replica of a first waterfowl,
  (b) a first catch coupled to the first replica;
  (c) a second replica of a second waterfowl;
  (d) a second catch coupled to the second replica; and
  (e) a keeper coupled to the hull and configured to fit into mating securement with the first catch and the second catch.

4. The radio controlled watercraft system of claim 1, further comprising the first throttle comprising a first reverse mechanism coupled to the first motor and the second throttle comprising a second reverse mechanism coupled to the second motor.

5. The radio controlled watercraft system of claim 1, further comprising a self-contained battery pack coupled to the first motor.

6. The radio controlled watercraft system of claim 1, further comprising:
  (a) a first controller coupled to the first electromagnetic signal generator and to the third electromagnetic signal generator; and
  (b) a second controller coupled to the second electromagnetic signal generator and to the fourth electromagnetic signal generator.

7. The radio controlled watercraft system of claim 6, further comprising a switch having a first position and a second position, wherein when in the first position the first controller actuates the first electromagnetic signal generator and the second controller actuates the second signal generator, and wherein when in the second position the first controller actuates the third electromagnetic signal generator and the second controller actuates the fourth signal generator.

8. The radio controlled watercraft system of claim 1, further comprising:
 (a) a first cage provided around the first propeller; and
 (b) a second cage provided around the second propeller.

9. The radio controlled watercraft system of claim 1, further comprising:
 (a) a decoy; and
 (b) a securement line coupled between the hull and the decoy.

10. The radio controlled watercraft system of claim 1, further comprising a strobe light coupled to the hull.

11. A radio controlled decoy system comprising:
 (a) a decoy;
 (b) a first motor coupled to the decoy;
 (c) a first throttle coupled to the first motor;
 (d) a first propeller coupled to the first motor;
 (e) a second motor coupled to the decoy;
 (f) a second throttle coupled to the second motor;
 (g) a second propeller coupled to the second motor;
 (h) means for generating a first radio signal;
 (i) means for generating a second radio signal;
 (j) a first radio signal receiver;
 (k) a second radio signal receiver;
 (l) wherein the first radio signal receiver is coupled to the first throttle;
 (m) wherein the second radio signal receiver is coupled to the second throttle;
 (n) a supplemental hull;
 (o) a third motor coupled to the supplemental hull;
 (p) a third throttle coupled to the third motor;
 (q) a third propeller coupled to the third motor;
 (r) a fourth motor coupled to the supplemental hull;
 (s) a fourth throttle coupled to the fourth motor;
 (t) a fourth propeller coupled to the fourth motor;
 (u) means for generating a third radio signal;
 (v) means for generating a fourth radio signal;
 (w) a third radio signal receiver;
 (x) a fourth radio signal receiver;
 (y) wherein the third radio signal receiver is coupled to the third throttle;
 (z) wherein the fourth radio signal receiver is coupled to the fourth throttle;
 (aa) a housing containing the means for generating a first radio signal, the means, for generating a second radio signal, the means, for generating a third radio signal and the means for generating a fourth radio signal.

12. The radio controlled decoy system of claim 11, further comprising a self-contained battery pack coupled to the first motor.

13. The radio controlled decoy system of claim 12, further comprising a strobe light coupled to the decoy.

14. The radio controlled decoy system of claim 12, further comprising a first strobe light reflector and a second strobe light reflector.

15. The radio controlled decoy system of claim 11, further comprising the first throttle comprising a first reverse mechanism coupled to the first motor and a second throttle comprising a second reverse mechanism coupled to the second motor.

16. The radio controlled decoy system of claim 11, further comprising:
 (a) a supplemental decoy; and
 (b) a securement line coupled between the hull and the supplemental decoy.

17. The radio controlled decoy system of claim 11, further comprising:
 (a) a second supplemental decoy;
 (b) a first securement line coupled between the decoy and the second supplemental decoy behind the decoy;
 (c) a third supplemental decoy; and
 (d) a second securement line coupled between the second supplemental decoy and the third supplemental decoy.

* * * * *